United States Patent [19]

Nagasawa et al.

[11] Patent Number: 4,712,050
[45] Date of Patent: Dec. 8, 1987

[54] CONTROL SYSTEM FOR BRUSHLESS DC MOTOR

[75] Inventors: Kiyoshi Nagasawa; Toru Inoue, both of Tochigi; Susumu Kashiwazaki, Utsunomiya, all of Japan

[73] Assignee: Hitachi, Ltd., Tokyo, Japan

[21] Appl. No.: 9,290

[22] Filed: Jan. 30, 1987

[30] Foreign Application Priority Data

Mar. 17, 1986 [JP] Japan .................................. 61-56804

[51] Int. Cl.[4] .......................................... H02K 29/06
[52] U.S. Cl. .................................... 318/254; 318/138
[58] Field of Search ............... 318/138, 254, 331, 334, 318/439, 459, 608, 634

[56] References Cited

U.S. PATENT DOCUMENTS

| | | | |
|---|---|---|---|
| 3,611,081 | 10/1971 | Watson | 318/254 X |
| 4,129,808 | 12/1978 | Bregeault et al. | 318/254 |
| 4,495,450 | 1/1985 | Tokizaki et al. | 318/138 |
| 4,608,527 | 8/1986 | Glennon et al. | 318/685 |
| 4,644,234 | 2/1987 | Nola | 318/138 X |

FOREIGN PATENT DOCUMENTS

| | | | |
|---|---|---|---|
| 57-28588 | 2/1982 | Japan | 318/138 |
| 57-160385 | 10/1982 | Japan | 318/254 |
| 58-32546 | 2/1983 | Japan | 318/254 |

*Primary Examiner*—Bentsu Ro
*Attorney, Agent, or Firm*—Antonelli, Terry & Wands

[57] ABSTRACT

A control system for brushless DC motors detects counter electromotive force voltages induced in motor windings and produces rotor position detection signals from the counter electromotive force voltages. The maximum value of an input DC current to a motor drive circuit is held and the phase of the rotor position detection signals is changed in accordance with the held value of the input DC current to prevent the phase of the position detection signals from varying with the load on the brushless DC motor.

11 Claims, 9 Drawing Figures

COMMUTATION LOADING ANGLE

CONTROL SYSTEM FOR BRUSHLESS DC MOTOR

BACKGROUND OF THE INVENTION

This invention relates to a brushless DC motor and more particularly to improvements on a control system for brushless DC motor which is capable of obtaining rotor position detection signals without resort to rotor position detecting sensors but from motor terminal voltages by using filters and comparators.

A conventional brushless DC motor is equipped with a counter electromotive force voltage based rotor position detecting circuit (hereinafter simply referred to as a position detecting circuit) comprised of filters and comparators and adapted to set up rotor position detection signals from motor terminal voltages. Such a motor is disclosed in, for example, JP-A No. 59-162793 filed by Hitachi, Ltd. in Japan on Dec. 26, 1975, Japanese Patent Pulbication No. 59-36519 filed by the same applicant in Japan on May 28, 1976, and "Brushless Motor without a Shaft Position Sensor", Trans. of the Institute of Electrical Engineers (IEE) of Japan, Vol. B. 105, No. 5, 1985.

As is referred to in the paper mentioned above, when the load upon the conventional brushless DC motor equipped with the position detecting circuit is increased, the phase of the rotor position detection signal, referenced to a motor induced voltage $E_o$, leads in proportion to an increase in winding current due to an increased load. Accordingly the phase of the winding current, which is in phase with the rotor position detection signal, also leads, degrading motor efficiency and in an extremity that the leading angle measures about 30°, causing a failure to detect rotor positions, which leads to stoppage of the motor.

Figure 1:
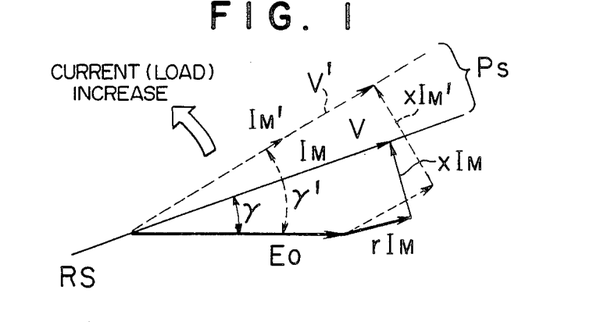
FIG. 1 is a voltage vector diagram reflecting a change in winding current during motor operation.

The above problems will be specifically explained below with reference to FIG. 1 illustrating a voltage vector diagram obtained when the brushless DC motor is controlled with rotor position detection signals from the position detecting circuit.

Referring to FIG. 1, given a motor current (motor winding current) $I_M$, a voltage V applied to the motor is equal to a vector sum of motor induced voltage $E_o$, voltage drop $rI_M$ due to a winding resistance and voltage drop $XI_M$ due to a winding reactance. The position detecting circuit prescribes in principle that the rotor position detection signal as indicated by PS in the vector diagram and the winding current $I_M$ be in phase with the applied voltage V.

Thus, as the winding current changes from $I_M$ to $I_M'$ in accordance with an increase in load, a solid-line vector diagram shifts to a dotted-line vector diagram as shown in FIG. 1.

This means that commutation leading angle $\gamma$ indicative of a phase difference between motor induced voltage $E_o$ and winding current $I_M$ increases as the winding current increases.

Especially where the commutation leading angle $\gamma$ exceeds 30° as mentioned previously, the winding current increases with an increase in commutation leading angle $\gamma$ even when the load stops increasing further, with the result that a positive feedback is established through increased commutation leading angle, increased winding current and increased commutation leading angle to increase the commutation leading angle $\gamma$ more and more and in an extremity, the motor output torque falls below the load torque, thus stopping the motor.

The reason why the phase of the rotor position detection signal produced from the position detecting circuit is shifted by the winding current is that the rotor position detection signal is in phase with the motor application voltage phase which changes with the winding current. Incidentally, since the position detection signal is obtained from the motor terminal voltage by using the filter and comparator, a change in the revolution number of the motor causes the phase angle of the filter to change according to its frequency characteristics. For example, when the revolution number of the motor increases, the frequency of motor terminal voltage is increased to increase the phase angle of the filter so that the commutation leading angle for motor control is changed for decreasing.

SUMMARY OF THE INVENTION

The present invention contemplates elimination of the above drawbacks of the conventional position detecting circuit and has for its object to provide a control system for brushless DC motor comprising a position signal generator which can correct the position detection signal for its change in phase due to an increase in the load to thereby operate the motor with optimized efficiency and to obviate a failure to detect rotor positions leading to stoppage of the motor.

Another object of this invention is to provide a brushless DC motor control system suitable for air conditioners which comprises a position signal generator capable of operating the motor with desired efficiency.

According to this invention, the maximum value of an input current to an inverter, in place of the winding current, is detected and held, and the phase of the position detection signal is corrected in accordance with the held maximum value and the revolution number of the motor to bring the position detection signal in phase with, for example, the motor induced voltage, thereby preventing the phase of the position detection signal from changing with the magnitude of the winding current and the revolution number.

The phase correction is also utilized to set the motor efficiency to a desired value so that the rise time for starting an air conditioner may be shortened. More particularly, the amount of phase correction is so changed as to operate the motor at a point which deviates a predetermined amount of phase from a phase of the position detection signal at which the motor efficiency becomes maximum, and loss of energy is utilized for warmup of the motor to accelerate temperature rise required for air heating.

DESCRIPTION OF THE PREFERRED EMBODIMENTS

Figure 2:
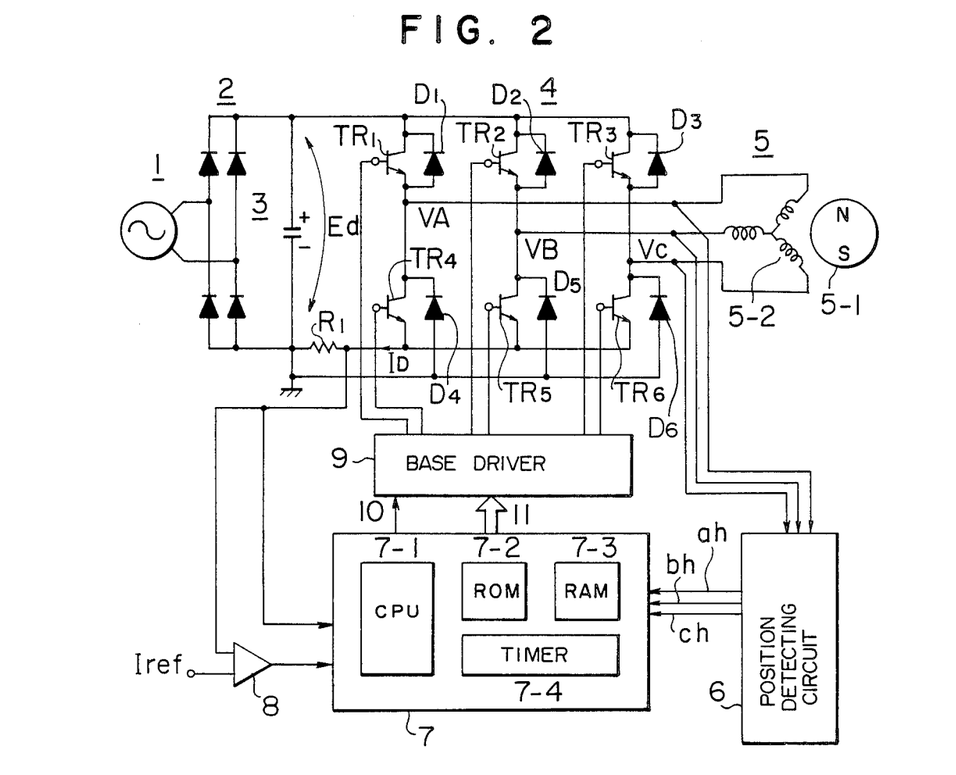
FIG. 2 is a circuit diagram showing the overall construction of a brushless DC motor control system according to the invention.

FIG. 2 shows the overall construction of a control system for brushless DC motor according to the invention.

A DC voltage $E_d$ converted from an AC voltage of an AC power source 1 through a rectifier circuit 2 and a smoothing capacitor 3 is supplied to an inverter 4.

This inverter 4 is of a 120° type which is comprised of transistors $TR_1$ to $TR_6$ and freewheeling diodes $D_1$ to $D_6$, and its AC output voltage is controlled by chopping the DC voltage $E_d$ under the application of pulse width modulation (PWM) during the conduction period (120° electrical angle) of the positive potential side transistors $TR_1$ to $TR_3$.

A resistor $R_1$ of low resistance is connected between a common emitter terminal of the transistors $TR_4$ to $TR_6$ and a common anode terminal of the freewheeling diodes $D_4$ to $D_6$.

A synchronous motor 5 standing for a brushless DC motor has a rotor 5-1 and a armature winding 5-2. A three-phase winding current flowing in the armature winding 5-2 is also passed through the low resistance resistor $R_1$, causing a voltage drop thereacross from which a motor current $I_D$ (resulting from full-wave rectification of the three-phase winding current $I_M$) can be detected.

A control circuit for controlling the speed of the synchronous motor 5 comprises a microcomputer 7, a position detecting circuit (based on counter electromotive force voltage) 6 for detecting positions of magnetic poles of the rotor 5-1 of synchronous motor 5, a current controller 8 for preparing a chopping signal which controls the motor current $I_D$, a base drive 9 for driving the transistors $TR_1$ to $TR_6$.

The microcomputer 7 is comprised of a CPU 7-1, a ROM 7-2, a RAM 7-3 and a timer 7-4 which are interconnected through the address bus, data bus and control bus, these buses being not illustrated in the drawing.

The ROM 7-2 is stored with various process programs necessary for driving the synchronous motor 5 including a program for speed control processing, for example. A known microcomputer may be used as the microcomputer 7. A PWM control signal 10 is supplied from the microcomputer 7 to the base driver 9. The current controller 8 detects direct current $I_D$ and then compares $I_D$ with a predetermined reference current value $I_{ref}$ so as to output over current signal to the microcomputer 7 when the detected value of $I_D$ exceeds the reference value $I_{ref}$.

The microcomputer 7 receives position detection signals ah, bh and ch delivered out of the position detecting circuit 6 and supplies a drive signal 11 to the base driver 9.

The position detecting circuit 6 produces the position detection signals ah, bh and ch corresponding to a rotor position from terminal voltage $V_A$, $V_B$ and $V_C$ of the armature winding 5-2 by using filter circuits and comparators. The operation of these filter circuits and comparators is described in detail in JP-A No. 59-36519 and Trans. IEE of Japan mentioned hereinbefore.

Figure 3:
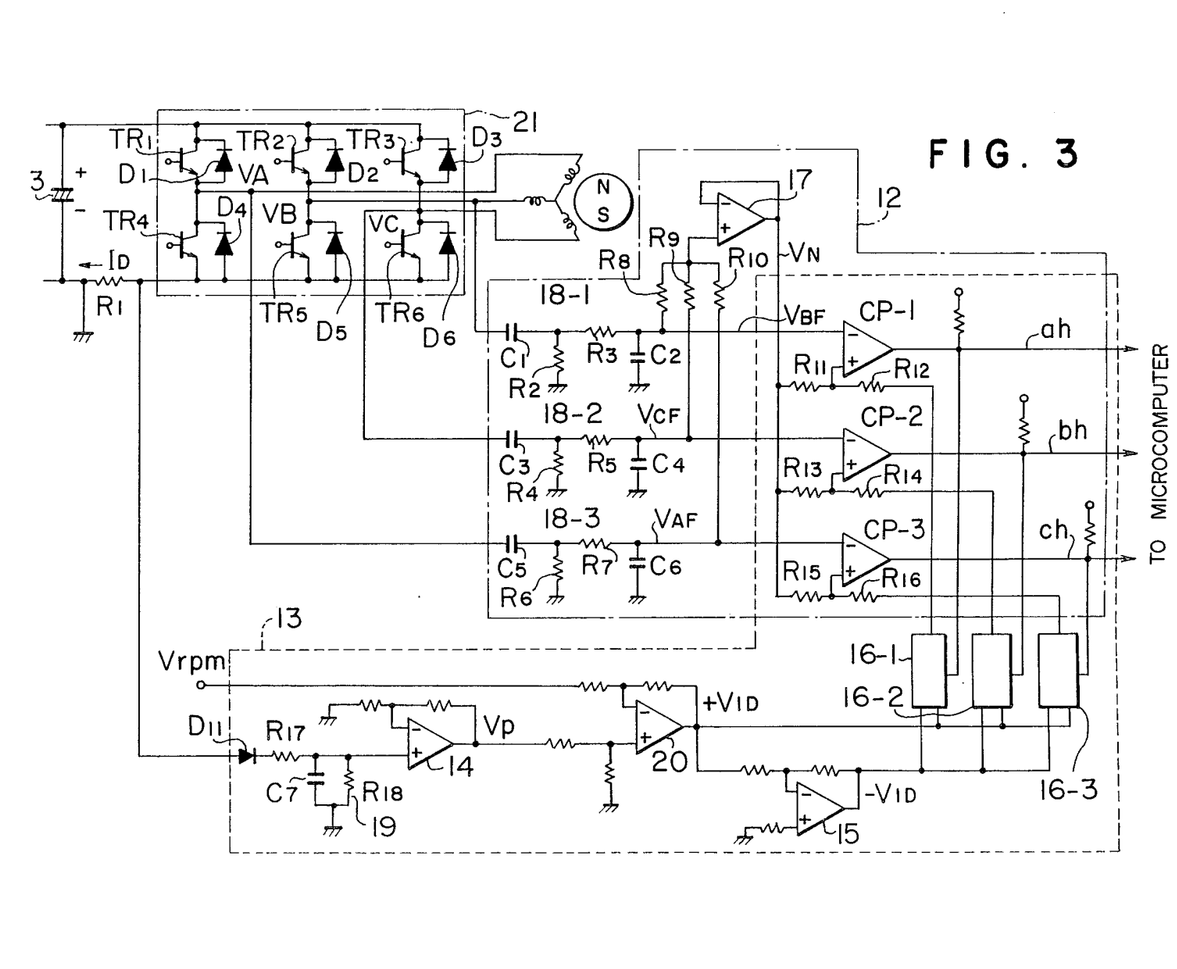
FIG. 3 is a circuit diagram of an essential part of the control system according to an embodiment of the invention.

FIG. 3 shows an embodiment of the invention by illustrating the essential part of a circuit wherein a position detecting circuit 12 is added with a position detection signal correcting circuit 13.

Figure 4:
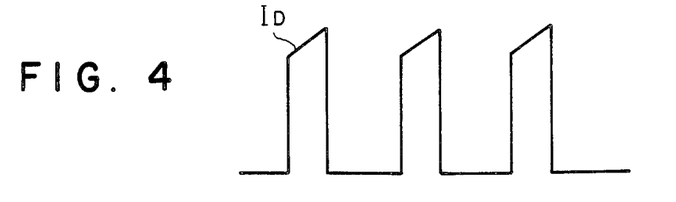
FIG. 4 shows a waveform of a DC input current to an inverter.
Figure 5:
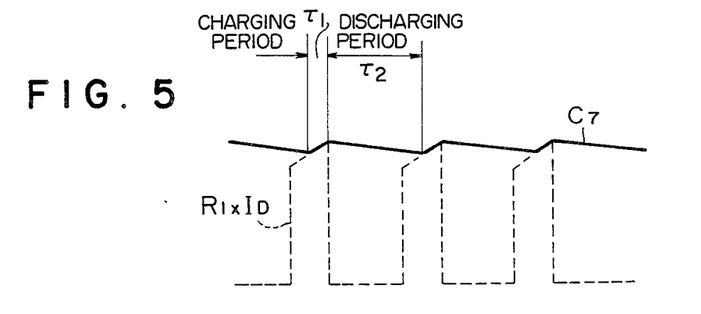
FIG. 5 shows a waveform illustrative of peak-hold of the DC input current shown in FIG. 4.

Referring to FIG. 3, an inverter 21 is a general-purpose 120° conduction type inverter comprised of transistors $TR_1$ to $TR_6$ and freewheeling diodes $D_1$ to $D_6$, with a common emitter terminal of the transistors $TR_4$ to $TR_6$ connected in common with a common anode terminal of the freewheeling diodes $D_4$ to $D_6$. A resistor $R_1$ of low resistance is connected between the inverter 21 and the negative polarity side of a smoothing capacitor 3 included in a DC power supply. A DC current $I_D$ is passed through the low resistance resistor $R_1$ when the motor is powered and it corresponds to a motor current developing when the transistors $TR_1$ to $TR_3$ are operated with chopping. A motor current developing when the transistors $TR_1$ to $TR_3$ are operated without chopping provides a freewheeling current within the inverter 21. The DC current $I_D$ is detected as a voltage drop across the low resistance resistor $R_1$. The thus developing voltage is fed to a peak hold circuit 19 included in the position detection signal correcting circuit 13 to charge a capacitor $C_7$ through a diode $D_{11}$ and a low resistance resistor $R_{17}$ at a rate determined by a time constant $\tau_1 = R_{17} \times C_7$, and an electrical charge stored in the capacitor $C_7$ is discharged through a resistor $R_{18}$ at a rate determined by a time constant $\tau_2 = R_{18} \times C_7$, in order that a peak value $I_{DP}$ of the DC current $I_D$ can be held by the peak hold circuit in course of changing of the DC current $I_D$ flowing through the low resistance resistor $R_1$. The DC current $I_D$ has a waveform as illustrated in FIG. 4 and charge/discharge at the capacitor $C_7$ of peak hold circuit 19 is carried out in accordance with a waveform as illustrated in FIG. 5. As will be seen from FIG. 4, the DC current $I_D$ is of a pulse waveform with a triangular top because the DC voltage $E_d$ undergoes ON-OFF duty control by the PWM control signal and the motor current is affected by an inductance of the motor winding.

The value of the charging time constant $\tau_1$ is so selected as to fall within a range in which the time constant $\tau_1$ can be insensitive to both surge current due to storage carrier of the freewheeling diodes $D_4$ to $D_6$ and steep external noise pulse and can sufficiently follow the rise of the DC current $I_D$. The discharging time constant $\tau_2$ is set to be sufficiently longer than the chopping period and the current rippling period due to variations in the power source frequency and rotation torque of a compressor, so as to approximate damping characteristics of the freewheeling current of motor current within the inverter 21.

Turning to FIG. 3, terminal voltages $V_A$, $V_B$ and $V_C$ delivered out of the inverter 21 are applied to the position detecting circuit 12 in which they are respectively passed through filters 18-3, 18-1 and 18-2 each having two capacitors, thus providing filter-pass voltages $V_{AF}$, $V_{BF}$ and $V_{CF}$. The filters 18-3, 18-1 and 18-2 provided for respective phase include capacitors $C_5$, $C_6$ and resistors $R_6$, $R_7$; capacitors $C_1$, $C_2$ and resistors $R_2$, $R_3$; and capacitors $C_3$, $C_4$ and resistors $R_4$, $R_5$.

A center voltage $V_N$ is produced from the three-phase filter-pass voltages $V_{AF}$, $V_{BF}$ and $V_{CF}$ by using resistors $R_8$, $R_9$ and $R_{10}$ and a buffer 17 and this center voltage $V_N$ is compared with the filter-pass voltages $V_{AF}$, $V_{BF}$ and $V_{CF}$ at comparators CP-3, CP-1 and CP-2, respectively, to provide position detection signals ah, bh and ch.

The comparators CP-1 to CP-3 have each hysteresis characteristics by being connected with sets of resistors $R_{11}$, $R_{12}$; $R_{13}$, $R_{14}$ and $R_{15}$, $R_{16}$, respectively, and form a part of the position detection signal correcting circuit 13.

The position detection signal correcting circuit 13 further comprises an amplifier 14, a subtracter 20 for subtracting a voltage $V_{rpm}$ proportional to the revolution number from an output voltage of the amplifier 14, a sign inverter 15, and analog switches 16-1 to 16-3. As described previously, the filter circuits 18-1, 18-2 and 18-3 have frequency characteristics and therefore their output phases change with the motor voltage frequency. To compensate frequency characteristics of the filters 18-1 to 18-3 for their change in output phases and consequently to provide a predetermined amount of phase correction at any motor revolution number, the output signal of the subtracter 20 is effectively used.

The analog switches 16-1 to 16-3 are responsive to output signals of the comparators CP-1 to CP-3 to switch over the passages of the differently signed voltages representative of the detected DC current.

Specifically, each of the analog switches 16-1 to 16-3 receives two voltages of which one is an output voltage $+V_{ID}$ of the subtracter 20 for subtracting the voltage $V_{rpm}$ proportional to the revolution number from output voltage $V_P$ of the amplifier 14 and the other is an output voltage $-V_{ID}$ of the sign inverter 15, and switches over the passages of the two voltages to transmit one of the two voltages to the associated comparator CP-1, CP-2 or CP-3 having hysteresis characteristics.

In the illustrated embodiment, each of the analog switches 16-1 to 16-3 passes the output voltage $+V_{ID}$ of the subtracter 20 to the comparator CP-1, CP-2 or CP-3 when responding to a high level of the output signal of each comparator and the output voltage $-V_{ID}$ when responding to a low level of the output signal of each comparator.

For respective phases, the position detection signal is produced from the terminal voltage of the inverter 21 as will be described below with reference to FIG. 6 by way of example of the position detection signal ah for one phase produced from the terminal voltage $V_B$.

Figures 6, 7:
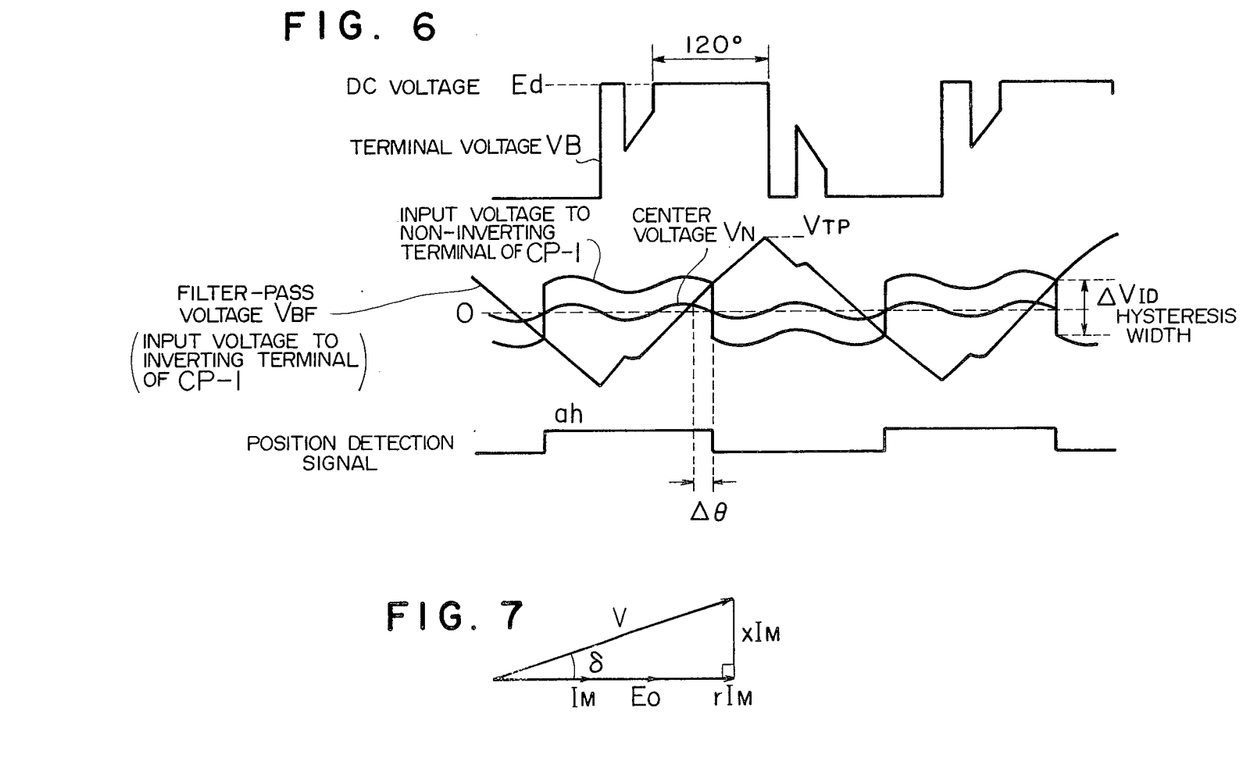
FIG. 6 illustrates waveforms appearing at points in the FIG. 3 circuit.
FIG. 7 is a voltage vector diagram for explaining phase correction.

FIG. 6 illustrates various waveforms appearing at points in the position detecting circuit 12, showing that the terminal voltage $V_B$ is passed through the filter circuit 18-1 so as to be converted into the triangular filter-pass voltage $V_{BF}$.

This filter-pass voltage $V_{BF}$ is applied to an inverting input terminal of the comparator CP-1 and compared with an input voltage to a non-inverting input terminal of the comparator CP-1 to produce the position detection signal ah. Since the input voltage applied to the non-inverting input terminal is a composite signal of the center voltage $V_N$, the output voltage $+V_{ID}$ from the subtracter 20 and the output voltage $-V_{ID}$ from the sign inverter 15, the phase of the position detection signal ah is corrected by the output voltages $+V_{ID}$ and $-V_{ID}$.

The hysteresis width of the comparator CP-1, designated by $\Delta V_{ID}$ in FIG. 6, is given by the following equation:

$$\Delta V_{ID} = \frac{2 \cdot R_{11}}{R_{11} + R_{12}} \cdot V_{ID} \tag{1}$$

The $V_{ID}$ (output voltage from the subtracter 20) is then expressed by the following equation:

$$V_{ID} = K \cdot R_1 \cdot I_{DP} - V_{rpm} \tag{2}$$

where $I_{DP}$ is the maximum value of the DC current $I_D$ and $V_{rpm}$ is the voltage proportional to the revolution number as described previously, and $R_1$ is the resistance of the low resistance resistor $Rp_1$ for motor current detection and K is the gain of amplifier 14.

From equations (1) and (2), it will be appreciated that as the maximum value $I_{DP}$ of DC current increases, the hysteresis width $\Delta V_{ID}$ increases in proportion to the maximum value $I_{DP}$.

With the hysteresis width $\Delta V_{ID}$ increased, the phase of the position detection signal becomes lagging. When approximating the filter-pass voltage $V_{BF}$ to be a triangular waveform having a peak value of $V_{TP}$ as shown in FIG. 6, a right-angled triangle having a height of $V_{TP}$ and a base of $\pi/2$ is geometrically analogous to a right-angled triangle having a height of $\Delta V_{ID}/2$ and a base of $\Delta\theta$. Therefore, a lagging angle $\Delta\theta$ corresponding to the amount of phase correction is given by $$\Delta\theta = \frac{\pi}{4 \cdot V_{TP}} \cdot \Delta V_{ID} \tag{3}$$

$$= \frac{\pi}{2} \cdot \frac{R_{11}}{R_{11} + R_{12}} \cdot \frac{1}{V_{TP}} (K \cdot R_1 \cdot I_{DP} - V_{rpm})$$

As described above, in the control system according to the FIG. 3 embodiment the comparators constituting the position detecting circuit are provided with hysteresis characteristics and the hysteresis width is changed in proportion to the motor current to retard the phase of the position detection signal, thereby ensuring that the phase leading phenomenon in the position detection signal which would inherently be caused by an increased motor current can be prevented.

Making reference to a vector diagram of FIG. 7, the relation between lagging angle $\Delta\theta$ corresponding to the amount of phase correction as indicated in equation (3) and motor current $I_D$ will be described. The vector diagram is a voltage vector diagram set up when the brushless DC motor is operated under the direction of the position detection signal described hereinbefore.

If the winding current $I_M$ being in phase with the position detection signal is so selected as to be in phase with the motor induced voltage $E_o$, a phase difference $\delta$ between applied voltage V and induced voltage $E_o$ is indicated by, $$\delta = \tan^{-1}\frac{XI_M}{E_o + rI_M} \tag{4}$$

When neglecting the winding resistance r and taking the approximation of $\tan\theta = \theta$, equation (3) is reduced to, $$\delta = \frac{L}{K_E} \cdot I_M \tag{5}$$

where $K_E$ is the motor generation constant and L is the winding inductance. Thus, by determining circuit constants in the position detection signal correcting circuit 13 such that the load angle δ indicated by equation (5) equals the lagging angle Δθ indicated by equation (3), the brushless DC motor can be operated in such a manner as to set up the voltage vector diagram of FIG. 7.

Since in the foregoing embodiment the lagging angle Δθ increases as the DC current $I_D$ increases, the winding current $I_M$ is always in phase or nearly in phase with the motor induced voltage $E_o$.

As described above, in contrast to the conventional position detecting circuit wherein as the winding current increases, the position detection signal takes a leading phase to greatly deviate from the phase of the motor induced voltage $E_o$ with the result that the motor efficiency is degraded and in an extremity, a failure to detect rotor positions stops the motor, the embodiment of the present invention ensures that changes in the phase of the position detection signal due to the winding current can be prevented by correcting the phase of the position detection signal with an amount related to the maximum value $I_{DP}$ of the DC current $I_D$ and an amount related to the revolution number, thereby excluding the motor stoppage trouble. This means that the load range permitted for the brushless DC motor to operate can advantageously be extended by increasing the winding current.

Further, the present embodiment permits the position detection signal to be placed in phase with the motor induced voltage and as compared to the conventional circuit, the output torque can be increased for a given winding current and conversely, the winding current can be decreased for a given torque, thereby improving the motor efficiency.

Although, in the foregoing embodiment of FIG. 3, the anodes of the diodes $D_4$ to $D_6$ and the emitters of the transistors $TR_4$ to $TR_6$ are connected in common to one end of the resistor $R_1$, the anodes of the diodes $D_4$ to $D_6$ may be connected to their common terminal and then grounded and likewise the emitters of the transistors $TR_4$ to $TR_6$ may be connected to their common terminal and then grounded as in the case of FIG. 2. The connection of FIG. 2 is more preferable because the motor current $I_D$ can all be detected, permitting more accurate phase correction.

Figure 8:
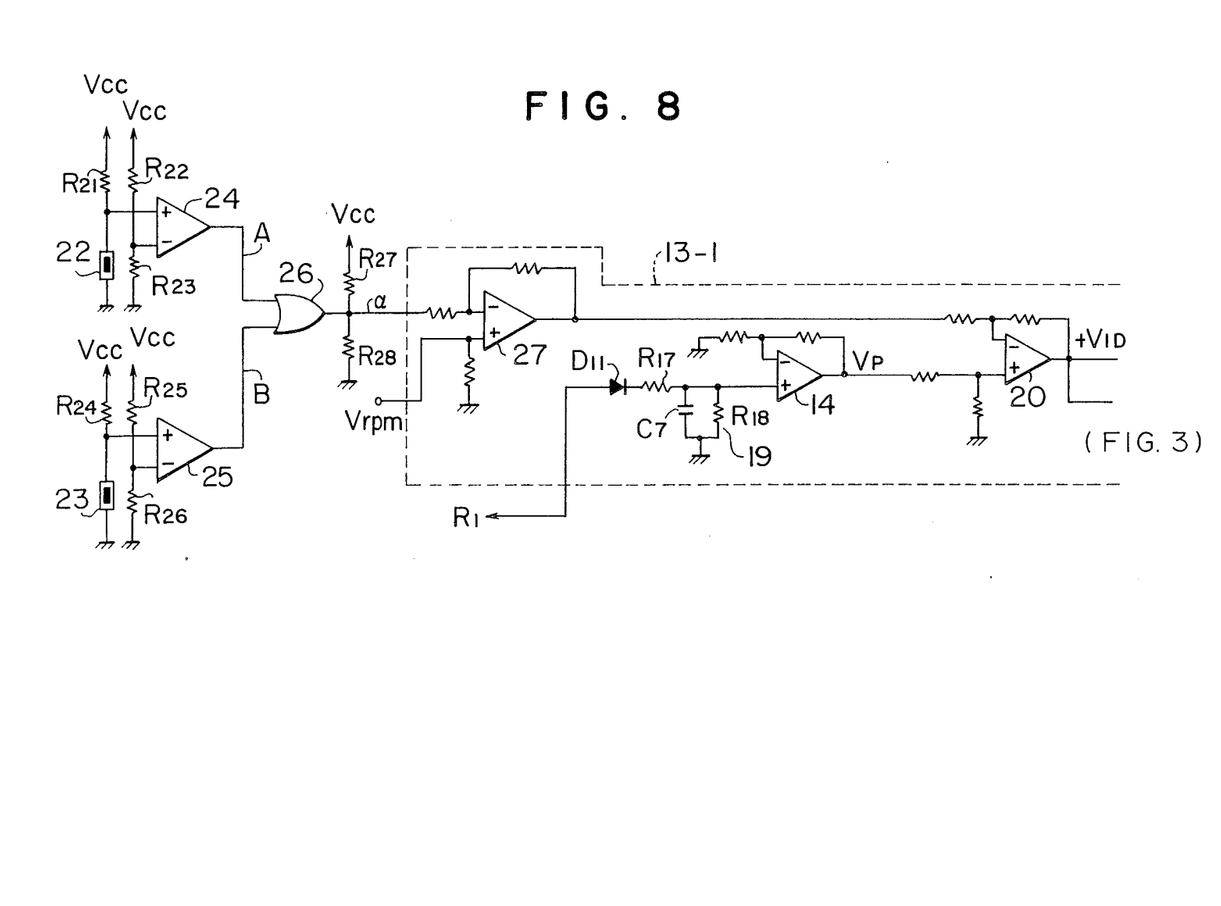
FIG. 8 is a fragmentary circuit diagram showing another embodiment of the invention.

Another embodiment of the present invention will now be described with reference to FIG. 8. The FIG. 8 embodiment is a modification of the position detection signal correcting circuit according to the invention and is suitable for use in a brushless DC motor control system applied to air conditioners. In FIG. 8, the same elements as those of FIG. 3 are designated by the same reference numerals and elements following the output of the subtracter 20 are not illustrated because of identity to those of FIG. 3.

In conventional air conditioners, with the aim of expediting the initial operation for air heating or the warm-up operation, the revolution number of the motor is increased or a heater separately provided for preheating coolant is operated when the air conditioner is started for air heating in a low temperature environment or when the heat exchanger is operated for defrosting. The FIG. 8 embodiment takes advantage of the phase correction function of the position detection signal correcting circuit in such a manner that the phase of the position detection signal is deviated from the normal value to operate the motor at a point of low motor efficiency and resulting energy loss is used to heat the motor. Accordingly, without resort to the heater, the time taken for warm-up can be decreased.

Referring to FIG. 8, a temperature sensor 22 of, for example, a thermistor is adapted to detect temperatures in the heat exchanger, and a temperature sensor 23 also formed of, for example, a thermistor is adapted to detect ambient temperatures. Comparators 24 and 25 are connected in association with the sensors 22 and 23, respectively, and a NOR gate 26 is connected to the outputs of the comparators 24 and 25. An output signal A from the comparator 24 becomes "High" when the temperature in the heat exchanger falls below a predetermined temperature (typically ice point). An output signal B from the comparator 25 becomes "High" when the ambient temperature falls below a predetermined temperature (for example, a temperature deviating from the room temperature by about 0° C.). With any one of the output signals A and B rendered "High", the NOR gate 26 is cut off. At that time, a voltage α at the output of the NOR gate 26 is, $$\alpha = \frac{R_{28}}{R_{27} + R_{28}} \cdot V_{CC} \tag{6}$$

When this value of α is inputted, along with the voltage $V_{rpm}$ representative of the motor revolution number, to a subtracter 27, the position detection signal correcting signal $V_{ID}$ is corrected to modify equation (2) as follows:

$$V_{ID} = K \cdot R_1 \cdot I_{DP} - (V_{rpm} - \alpha) \tag{7}$$

Figure 9:
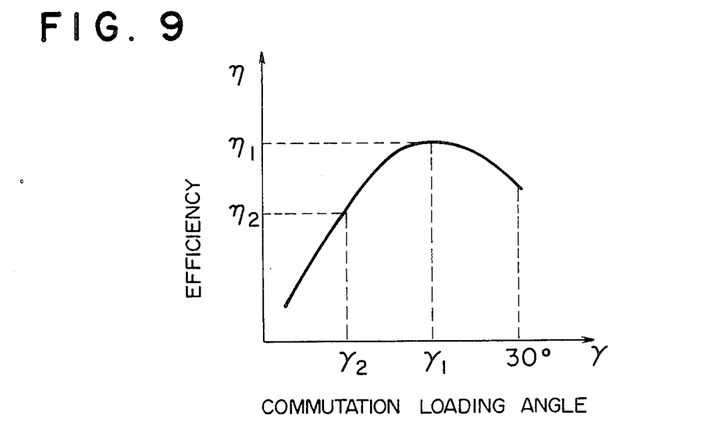
FIG. 9 is a graph showing the relation between commutation leading angle and efficiency in the brushless DC motor.

Generally, the commutation leading angle γ is related to the motor efficiency η as graphically illustrated in FIG. 9. Accordingly, where, for normal operation with α=0, the commutation leading angle γ takes $\gamma_1$ at which the efficiency η takes an optimum value of $\eta_1$, the value of α may be so selected as to cause the commutation leading angle γ to take $\gamma_2$ at which the efficiency η takes a value of $\eta_2$ that is below the optimum value $\eta_1$, during the start operation at low temperatures or during the defrosting operation.

We claim:

1. A control system for brushless DC motors comprising:
   a brushless DC motor having a field rotor and a plurality of stator windings;
   a position detecting circuit for detecting counter electromotive force voltage signals generated in said stator windings as said field rotor rotates and generating rotor position detection signals on the basis of said counter electromotive force voltage signals;
   a driver circuit connected to said stator windings of said motor and being responsive to said rotor position detection signals to control conduction of current from a DC power supply to said stator windings;
   a current detecting circuit for detecting an input current to said driver circuit from said DC power supply;
   a hold circuit for holding a maximum value of the detected input current; and
   a phase correcting circuit for correcting the phase of said rotor position detection signal in accordance with the held value of said input current.

2. A brushless DC motor control system according to claim 1 further comprising speed detection means for detecting speed of said motor, wherein said phase correcting circuit comprises means for changing the amount of phase correction subject to the maximum value of said input current in accordance with the detected speed of said motor.

3. A brushless DC motor control system according to claim 1 wherein said phase correcting circuit increases the amount of phase correction as the maximum value of said input current increases.

4. A brushless DC motor control system according to claim 2 wherein said means for changing the amount of phase correction decreases said amount of phase correction as the speed of said motor increases.

5. A brushless DC motor control system according to claim 4 wherein said brushless DC motor is a synchronous motor having a three-phase stator winding of star connection, said, driver circuit comprises an inverter circuit having a plurality of semiconductor switching elements in three-phase bridge connection, said position detecting circuit comprises filter circuits connected to respective phase windings, for converting said counter electromotive force voltage signals into triangular-waveform signals, means for combining the triangular-waveform signals for respective phase to provide a center voltage of said star connection, and means for producing said rotor position detection signals by comparing said center voltage with said triangular-waveform signals for respective phases, and said phase correcting circuit is connected to said rotor position detection signal producing means so that said amount of phase correction is combined with said center voltage being compared with said triangular-waveform signals.

6. A brushless DC motor control system according to claim 5 wherein said hold circuit comprises a RC peak hold circuit having a predetermined time constant capable of holding the maximum value of said input current.

7. A brushless DC motor control system according to claim 6 wherein said means for changing the amount of phase correction comprises a subtracter circuit for subtracting the output signal of said speed detection means from the output signal of said peak hold circuit.

8. A brushless DC motor control system according to claim 2 further comprising means for detecting temperatures at a predetermined location, wherein said means for changing the amount of phase correction comprises means for changing the amount of phase correction subject to the maximum value of said input current in accordance with the detected temperature.

9. A brushless DC motor control system according to claim 8 wherein said means for changing the amount of phase correction in accordance with the detected temperature comprises means for subtracting the output signal of said means for detecting temperatures from the output signal of said means for changing the amount of phase correction in accordance with the detected speed of said motor.

10. A motor control system for inverter-controlled air conditioners comprising:
   a brushless DC motor having a field rotor and a plurality of stator windings and driving a compressor of an air conditioner;
   a position detecting circuit for detecting counter electromotive force voltage signals generated in said stator windings as said field rotor rotates and generating rotor position detection signals on the basis of said counter electromotive force voltage signals;
   a driver circuit connected to said stator windings of said motor and being responsive to said rotor position detection signals to control a voltage supplied from a DC power supply to said stator windings;
   a current detecting circuit for detecting an input current to said driver circuit from said DC power supply;
   a hold circuit for holding a maximum value of the detected input current;
   a phase correcting circuit for correcting the phase of said rotor position detection signal in accordance with the held value of said input current;
   a first temperature sensor for detecting ambient temperatures;
   a second temperature sensor for detecting temperatures in a heat exchanger of said air conditioner; and
   means for changing the amount of phase correction obtained from said phase correcting circuit either when the temperature detected by said first temperature sensor falls below a first predetermined temperature or when the temperature detected by said second temperature sensor falls below a second predetermined temperature.

11. A motor control system for inverter-controlled air conditioners according to claim 10 further comprising means for detecting speeds of said motor, wherein said phase correcting circuit comprises means for changing the amount of phase correction subject to the maximum value of said input current in accordance with the detected speed of said motor.

* * * * *